United States Patent [19]
Kjos

[11] Patent Number: 5,711,374
[45] Date of Patent: Jan. 27, 1998

[54] METHOD FOR CYCLONE SEPARATION OF OIL AND WATER AND AN APPARATUS FOR SEPARATING OF OIL AND WATER

[75] Inventor: Tore Kjos, Oslo, Norway

[73] Assignee: Read Process Engineering A/S, Hvalstad, Norway

[21] Appl. No.: 454,386

[22] PCT Filed: Dec. 16, 1993

[86] PCT No.: PCT/NO93/00193

§ 371 Date: Jul. 28, 1995

§ 102(e) Date: Jul. 28, 1995

[87] PCT Pub. No.: WO94/13930

PCT Pub. Date: Jun. 23, 1994

[30] Foreign Application Priority Data

Dec. 17, 1992 [NO] Norway ................................ 924896

[51] Int. Cl.[6] ............................................. E21B 43/40
[52] U.S. Cl. ..................... 166/265; 166/243; 210/170; 210/512.2; 210/788
[58] Field of Search ............................... 166/265, 243; 210/512.2, 170, 788

[56] References Cited

U.S. PATENT DOCUMENTS

| | | | |
|---|---|---|---|
| 4,296,810 | 10/1981 | Price | 166/265 |
| 4,688,650 | 8/1987 | Hayatdavoudi et al. | 210/788 X |
| 4,738,779 | 4/1988 | Carroll et al. | 210/512.2 |
| 4,805,697 | 2/1989 | Fouillout et al. | 166/265 |
| 5,296,153 | 3/1994 | Peachey | 166/265 X |
| 5,456,837 | 10/1995 | Peachey | 166/265 X |

FOREIGN PATENT DOCUMENTS

| | | | |
|---|---|---|---|
| 0022357 | 1/1981 | European Pat. Off. | |
| 1645478 | 4/1991 | U.S.S.R. | 166/265 |

*Primary Examiner*—Hoang C. Dang
*Attorney, Agent, or Firm*—Browdy and Neimark

[57] ABSTRACT

The invention describes the separation of oil and water in a production flow from a hydrocarbon reservoir, said separation being carried out by the use of one cyclone or a plurality of cyclones positioned downhole. The produced water is reinjected into the reservoir itself or into a formation zone lying above or below the reservoir.

18 Claims, 7 Drawing Sheets

METHOD FOR CYCLONE SEPARATION OF OIL AND WATER AND AN APPARATUS FOR SEPARATING OF OIL AND WATER

FIELD OF THE INVENTION

The invention relates to a method for cyclone separation of oil and water in a production flow from a hydrocarbon reservoir.

DESCRIPTION OF THE RELATED ART

The invention also relates to an apparatus for separation of oil and water in a production flow from a hydrocarbon reservoir, said apparatus comprising one cyclone or a plurality of cyclones.

The production flow from a hydrocarbon reservoir contains large amounts of water, as well as other impurities. At some point the production flow must therefore be processed, a process during which oil and water are separated. Through this separation the so-called "produced water" appears. Separating the water at an early stage offers the advantage of freeing the production system from the encumbrance of the separated water component.

All the way up through the production pipe, to the wellhead and beyond, a loss of pressure occurs in the production flow, resulting in gas generation. In the cyclone separation of the production flow, this gas will be a very disruptive and undesirable element.

Liquid/liquid cyclone separation is a very favorable process, but requires, as indicated, that large amounts of gas be avoided. It is known that a separation under high pressure, for example at 400 bar, means, in practice, that no gas is present during the process. In addition, at this point the liquid has hardly been affected by shearing forces and will therefore contain few emulsions or components which are difficult to separate.

OBJECTS AND SUMMARY OF THE INVENTION

This recognition is the basis of the invention, which consists in making a cyclone separation of oil and water in a production flow under favorably high pressures, as they exist downhole.

In a well this method requires the use of cyclones which have a small diameter, so that one obtains small units in terms of volume and achieves good separation by means of high g forces.

By carrying out the separation of oil/water in the reservoir one will, because of the high pressure, avoid the generation of gas components resulting from the inevitable drop of pressure above the separation cyclone, a circumstance which otherwise would cause problems in the liquid/liquid separation.

This early separation of water and oil in the production flow will provide great benefits in connection with the further transport and treatment of the oil. Today water/oil mixtures are separated after/above the wellhead. According to the invention, one intentionally descends into the well to exploit the special, favorable conditions there, namely the high pressure and the low degree of emulsion. High pressure means that one may, in practice, proceed as if there were only one phase (liquid phase). At the high pressure existing downhole there will be practically only one phase, i.e., only a small amount of gas. The separated water may be returned to the reservoir. This means that the oil content of the water is not lost, but returns to the reservoir. The produced water may, for example, also be reinjected into a so-called "waste zone" higher up in the well, above the oil reservoir. Such a waste zone will therefore be a zone having less pressure, making it possible to direct the produced water up between the well casing and the production pipe, in several cases without pumping.

According to the invention a method is thus proposed for cyclone separation of oil and water in a production flow from a hydrocarbon reservoir, characterized in that the production flow is subjected to cyclone separation downhole in the reservoir.

According to the invention, this cyclone separation may advantageously be carried out in several stages.

It is especially advantageous according to the invention that the water produced by the cyclone separation be passed back to the reservoir.

The water produced by the cyclone separation may also be directed to a zone in the well outside the reservoir or to an injection point. The water produced by the cyclone separation may, for example, also be passed to a well zone in a higher layer having less pressure.

As mentioned, the invention also relates to an apparatus for separating oil and water in a production flow from a hydrocarbon reservoir, said apparatus comprising one cyclone or a plurality of cyclones and being characterized, according to the invention, in that the cyclone or cyclones are positioned downhole in the reservoir.

It is expedient that the perforation of the well adjacent to the cyclone should be perforated with apertures smaller than the smallest critical aperture of the cyclone.

Advantageously, the apparatus according to the invention may have a modular construction employing one cyclone or a plurality of cyclones per module. The annulus existing between the casing and production pipe may advantageously be utilized for distributing unseparated oil/water to all modules.

According to one embodiment, a special production pipe for the separated (produced) water may lead to a well zone in a higher layer having less pressure, or the annulus above the packer of the reservoir may be used for transport of produced water to this well or waste zone.

The apparatus may advantageously comprise a pump for reinjecting the produced water into the reservoir.

In order to facilitate positioning and retrieving equipment, the individual modules may, according to the invention, be designed with couplings corresponding to the pipe threads of standard production pipe strings. One may then handle the apparatus according to the invention with the equipment which is otherwise used for drill strings and production pipes.

An especially expedient cyclone embodiment according to the invention is a narrow cyclone having a diameter of 20–200 mm and one or several tangential inlets for the liquid that is to be separated, the cyclone body being designed weakly concave in terms of rotation symmetry.

Advantageously, the interior of the cyclone may consist of or be coated with a ceramic material that is highly resistant to wear.

With the method and apparatus according to the invention one achieves particularly, as indicated, the advantage that the separation can proceed under favorable conditions, as a result of the high pressure downhole. It has been mentioned that removing as much water as possible from the production flow represents an advantage. This provides, for example, great benefits with respect to the formation of hydrates, particularly in extended subsea lines. Conditions also become favorable in terms of reducing or preventing corrosion in wells and lines. One may avoid the use of the glycol/methanol additive otherwise required for the line system, as well as the use of corrosion inhibitors. In a subsea station or on a platform one will, by means of the invention, be able to avoid the transportation and treatment of produced water.

An especial advantage is that the well and the perforation (in the casing) may be placed lower with respect to the oil/water/gas level in the reservoir, thereby providing increased security in terms of gas penetration.

The bottom reject of the cyclone, i.e., mainly water, may advantageously be pumped back into the water portion of the reservoir by means of a downhole pump. In the reservoir, the oil content of the bottom reject will not be lost, nor will it pollute. There are several advantages connected with reinjection into the water portion of a reservoir. Thus, contamination of the environment on the surface is avoided. Nearly all the oil is recaptured and brought back to the reservoir. One will avoid energy loss from the bottom part of the well via a processing unit on the top back to the bottom part of the well by the reinjection of produced water. On a platform it will be possible to operate with a smaller processing unit, which has less weight and requires less space.

In the reservoir it will be possible to better maintain the pressure, and by reinjection at a water injection point it will be possible to increase the production from the reservoir.

As mentioned above, the produced water may also be reinjected into a waste zone higher up in the well, above the oil reservoir. Such a zone will be a zone having less pressure, and the produced water may advantageously pass between the casing and the production pipe up to the perforation in such a zone. At correct pressure conditions it will, as indicated, be possible to avoid pumping, or gas lift pumping in the annulus may be used, for example, by means of $CO_2$ from a turbine.

Reinjection of produced water into the reservoir may take place with a minimal pressure drop. One may achieve this, for example, by reinjecting the water into a particularly porous zone and by using a large flow-through surface and correspondingly low velocities. Directional drilling with a smaller diameter may be carried out in order to provide a waste well which distributes the produced water with minimal drop in pressure.

The invention makes it possible to place the well perforation lower in the oil zone of the reservoir. Cyclone separation implies that high water cuts are allowed and made use of. When there is about 70% water in the oil, the water will separate almost instantly, even though it shows a significant degree of emulsion at a lower water content. This circumstance offers the possibility of increasing the recovery rate of the reservoir; it reduces the possibility of gas penetration in reservoirs having gas caps; by operating on a generally high water cut (70%), the produced water may be better utilized as an emulsion breaker; water injection may be used in fields where higher water cuts are permitted; thinner oil zones than normal may be utilized; and a certain amount of water penetration from shallow reservoirs may be permitted (koning).

BRIEF DESCRIPTION OF THE DRAWING

The invention will now be explained and further elucidated with reference to the drawings, wherein.

DETAILED DESCRIPTION OF THE PREFERRED EMBODIMENTS

Figure 1:
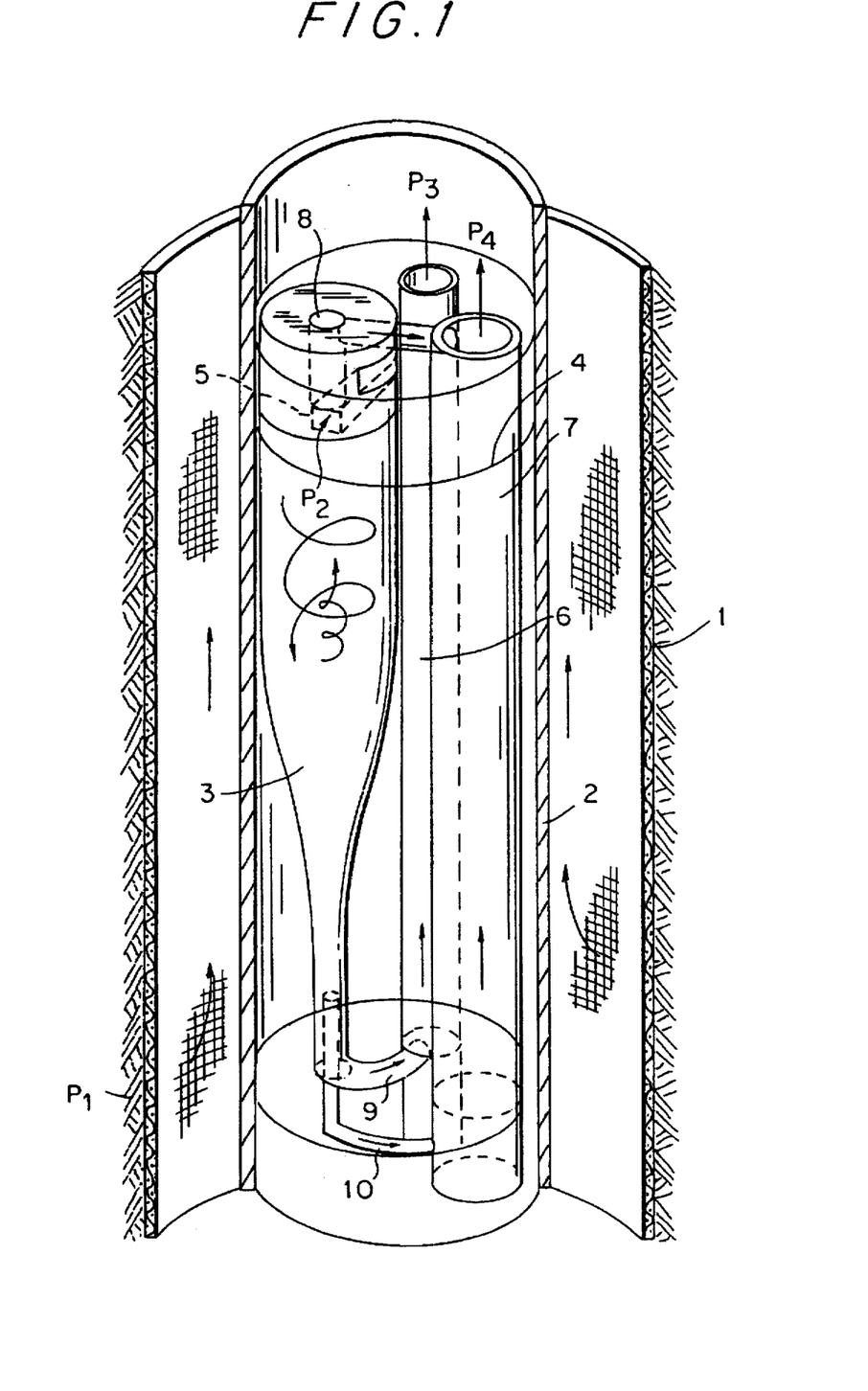
FIG. 1 shows a schematic section of a well having a cyclone.

In the schematic section of a well shown in FIG. 1 the perforated casing is represented by the numeral 1. The cylindrical housing of a separation module of the well is represented by 2. In the cylindrical housing 2 an oil/water cyclone separator 3 is mounted, as shown. In a screening device or mesh pad 4 in the cylindrical housing 2 there is a tangential lateral inlet 5 for the cyclone 3 opening on the cylindrical housing 2. In the cyclone 3 an oil/water separation takes place, forming an oil core which ascends and leaves through the outlet 8 for the top reject. Through the outlet 8 the oil passes to the pipe 7, which is an oil transporting pipe inside the production pipe (not shown in FIG. 1). The bottom reject passes tangentially out through the outlet 9, which ends in a pipe 6 for produced water.

In the bottom reject outlet 9 there is, as indicated, a core outlet 10 for the oil-rich core portion of the bottom reject. This outlet 10 leads to the oil pipe 7. The purpose of the outlet 10 is to capture "leaks" from the oil core and to direct such oil back to the oil flow.

Figure 2:
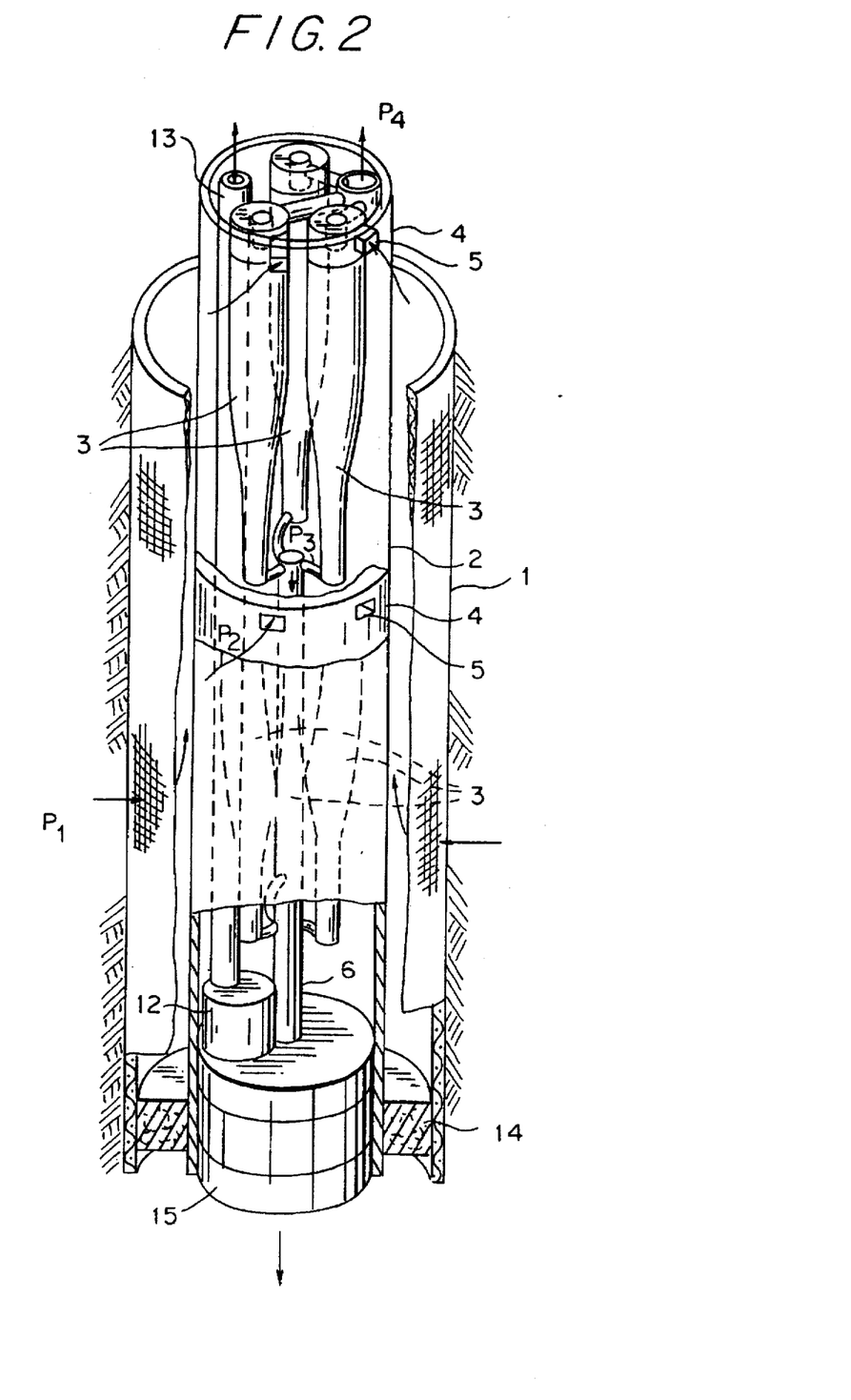
FIG. 2 shows a schematic section of a well having several cyclones.

FIG. 2, which is a section of a well having a casing 1 and a cylinder housing 2, shows a group consisting of six cyclones 3. These cyclones are supplied with an oil/water mixture in the same manner as in the embodiment in FIG. 1, and also deliver their top and bottom rejects in the same manner. The special lower outlet 10 is neither shown nor used here.

Thus, the six cyclones 3 deliver their top rejects to the oil transporting pipe 7 and the bottom rejects to the produced water transporting pipe 6. The pipe 5 for produced water leads to a pump 15. The pump motor 12 of this pump is connected to a power source, not shown, by means of the hydraulic, concentrically mounted pipes 13 or by electric cables through the same pipes. By means of the pump 15 the produced water is pressed downwards in the production pipe 2 in order to be returned to a formation zone below the zone defined by the packer 14.

The separated oil ascends through the oil pipe 7.

In FIG. 1, as well as in FIG. 2, the perforation of the casing is similar to a mesh having a mesh width smaller than the smallest aperture of the cyclone. Only one tangential inlet 5 is shown for each cyclone, but a cyclone may have several such tangential inlets.

Figure 3:
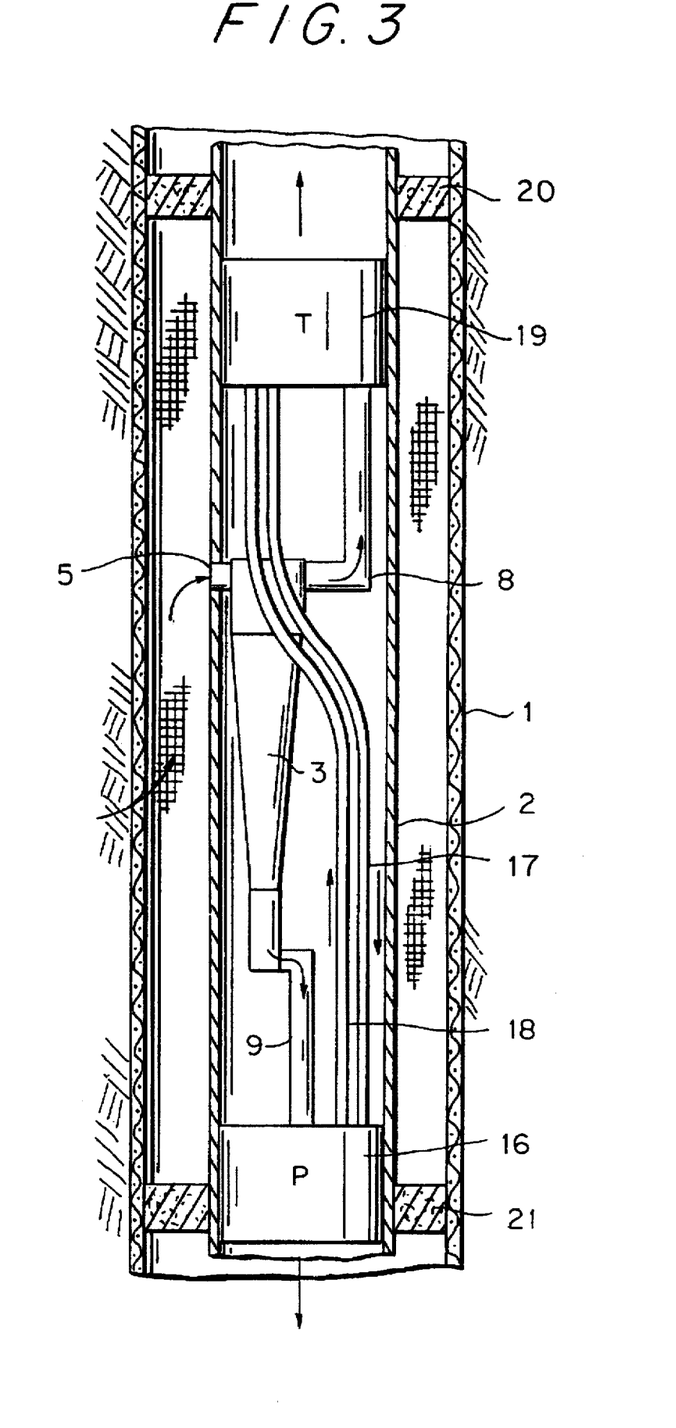
FIG. 3 shows a schematic section of a well having a cyclone and pertaining turbine and pump.

In FIG. 3 there is, in a cylindrical housing 2 in a well, the casing of which is represented by 1, shown a cyclone separator 3, similar to that of FIG. 1, having a tangential inlet 5, top reject outlet 8 and bottom reject outlet 9.

The outlet 8 for the top reject (oil) may lead to a turbine 19 if the pressure allows this, and from there higher up through the production pipe. The bottom reject passes through the outlet 9 to a pump 16. This pump 16 is by means of the hydraulic lines 17, 18 connected to the oil-driven turbine 19, which thus acts as a motor for the pump 16, which presses produced water down the production pipe to a zone below the lowest packer 21. In FIG. 3 there is also indicated an upper packer 20 which defines the upper limit of the production zone.

Figure 4:
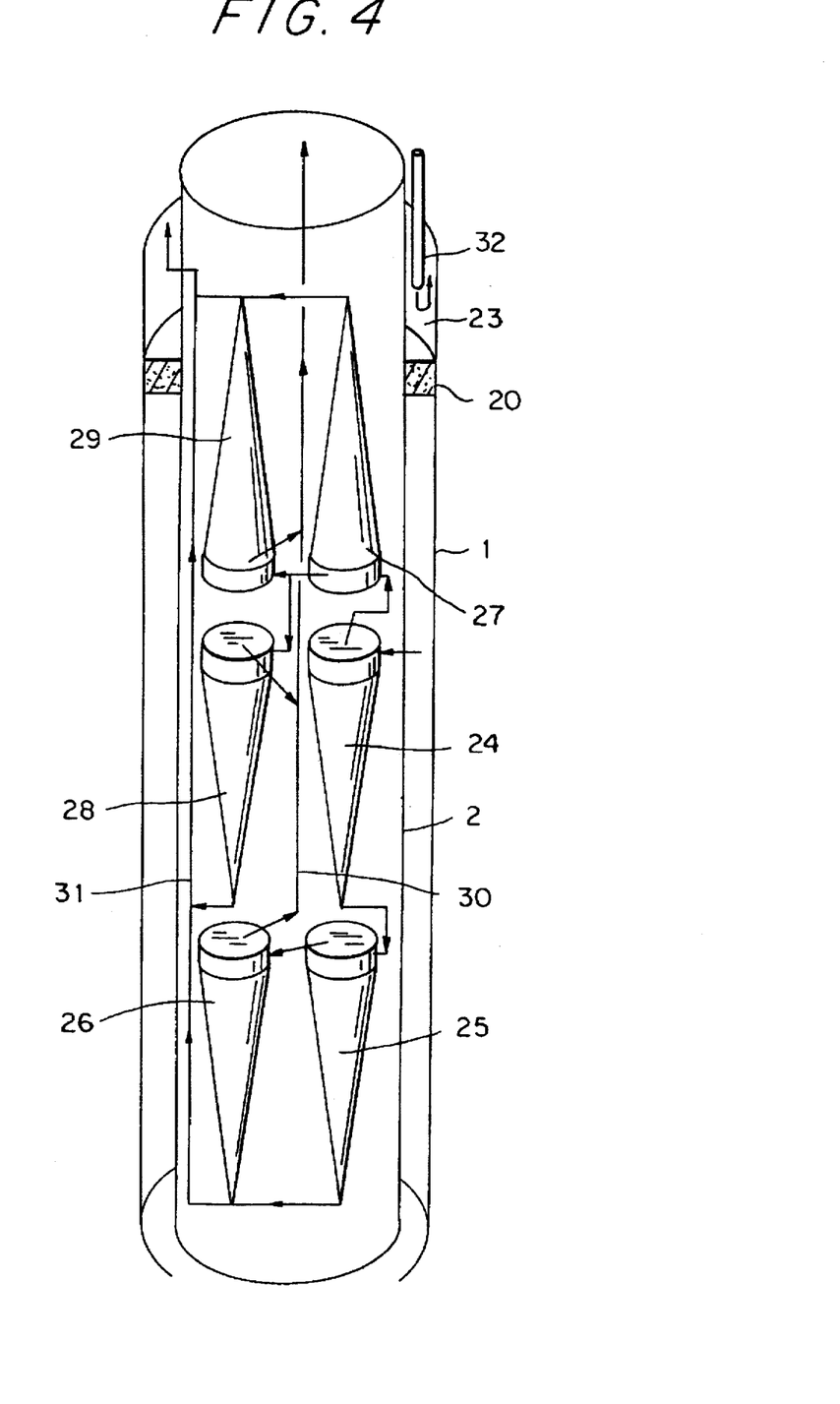
FIG. 4 shows a schematic section of a well having cyclones.

FIG. 4 shows, in a well section, an arrangement where separation takes place in several stages, thereby increasing the efficiency so that the residue of water in the oil or of oil in the produced water may satisfy the strictest requirements with respect to transport quality in a transport system, preferably on the ocean floor, or may comply with environmental regulations with respect to outlet pumps for reinjection. In FIG. 4 a cyclone 24 is connected to the annulus between the casing 1 of the well and the cylindrical housing 2. In this cyclone 24 a separation takes place. Top reject oil-water passes through the top outlet to a cyclone 27. Bottom reject water-oil from the cyclone 24 passes to a cyclone 25.

From the cyclone 27 top reject oil passes to the two dewatering cyclones 29 and 28. These two cyclones provide a separation resulting in a bottom reject in the form of produced water, which enters the produced water line 31. The produced water line 31 also receives bottom reject from the de-oiling cyclone 25 and from the cyclone 26, which receives top reject oil from the cyclone 25 and delivers top reject oil to the oil pipe 30. The oil pipe 30 also receives top reject oil from the cyclone 28 and from the cyclone 29.

The produced water pipe delivers produced water to the annulus 23 above the packer 20. In the annulus 23 there is indicated a $CO_2$ line 32, used for gas lift pumping of the produced water in the annulus 23. The oil pipe 30 ascends through the production pipe 2.

The system shown in FIG. 4 offers also, in addition to increased efficiency, the possibility of placing the well perforation lower down in the oil zone. It is known that at about 70% water content in the oil the water will separate almost instantly, although it, in lower concentrations, will give a significant degree of emulsion. This will offer the possibility of increasing the recovery of the reservoir reducing the likelihood of receiving gas penetration in reservoirs having gas caps utilizing produced water as an emulsion breaker by operating on generally high water cuts (70%)

avoiding problems with water penetration from shallow reservoirs (koning)

utilizing thinner oil zones better than what is normally done.

The modular arrangement in itself may also be made more narrow by having the cyclones placed one after the other. It will also be possible to use a production pipe for separation, whereas, for example, one or two production pipes are used for transporting oil and produced water.

Although not specially shown, it is understood that the cyclone model itself may consist of one cyclone or a plurality of cyclones put together in a string of modular units having no physical limitations other than the diameter and length of the well, the modules being joined with threaded couplings corresponding to those known from drill and production pipe technology. Therefore, concerning the number of modules there are no limitations other than those generally encountered in wells in terms of spatial conditions.

Figure 5A:
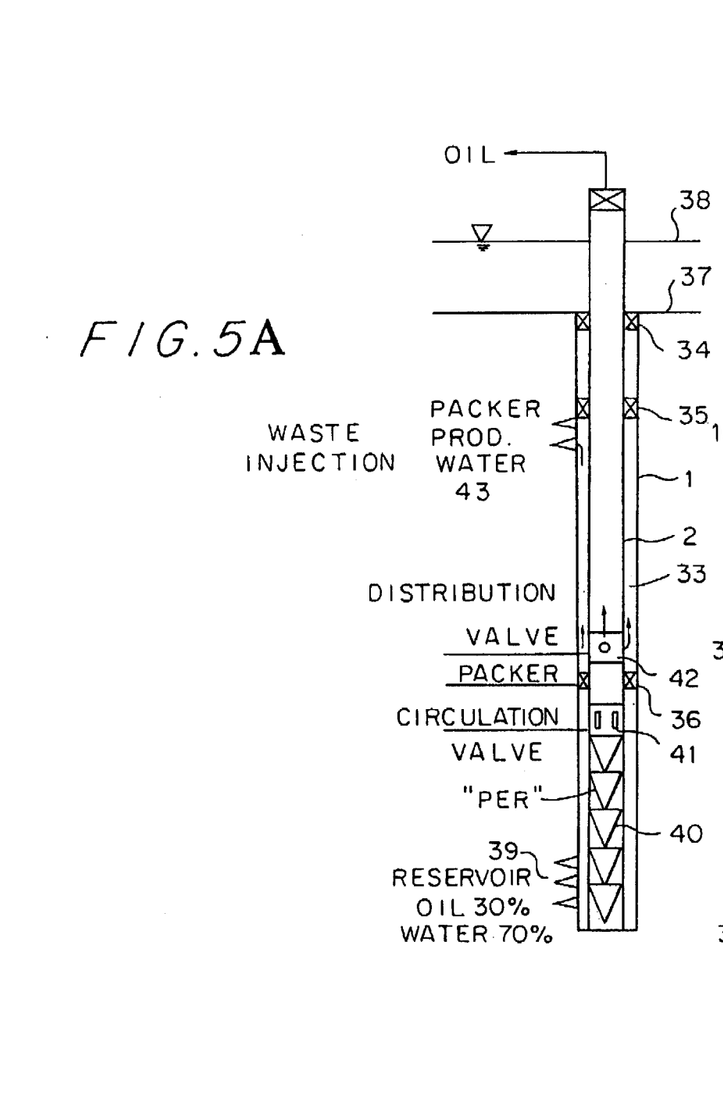
FIG. 5A shows a depth diagram for a well.
Figure 5B:
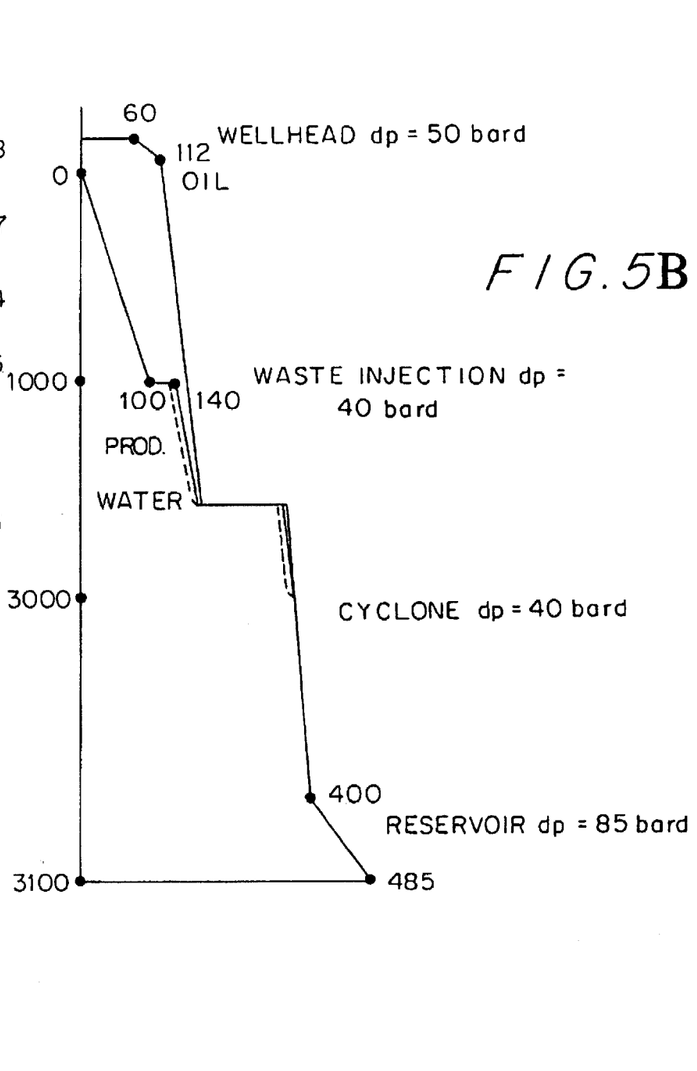
FIG. 5B shows a pressure diagram for a well.

FIGS. 5A and 5B show depth and pressure diagrams for a well in which the invention is used.

In FIG. 5A, the casing of the well is represented by 1 and the cylindrical housing is represented by 2, as they were in the above mentioned figures. The annulus 33 is here sealed off with three packers—an upper packer 34, an intermediate packer 35 and a lower packer 36. The well is an offshore well, the ocean floor being indicated by the numeral 37, the ocean surface by 38.

The producing zone in the reservoir is indicated by 39 and the lower packer 36 defines the upper limit of the production zone. In the production zone there is a cyclone apparatus 40 according to the invention. A circulation valve is represented by 41.

Above the packer 96 there is a distribution valve 42 connected to oil and produced water pipes (not shown) of the apparatus according to the invention. Through this three-way valve 42 oil may be conveyed up through the production pipe, whereas the produced water is directed up through the annulus 33 to a waste zone 43, the upper limit of which is defined by the packer 35.

FIG. 5B is a pressure diagram in which the ordinate indicates the depth of the well, down to 3,100 m, whereas the abscissa indicates the well pressure in bar. The separate difference pressures are indicated on the extreme right of the diagram.

Figure 6:
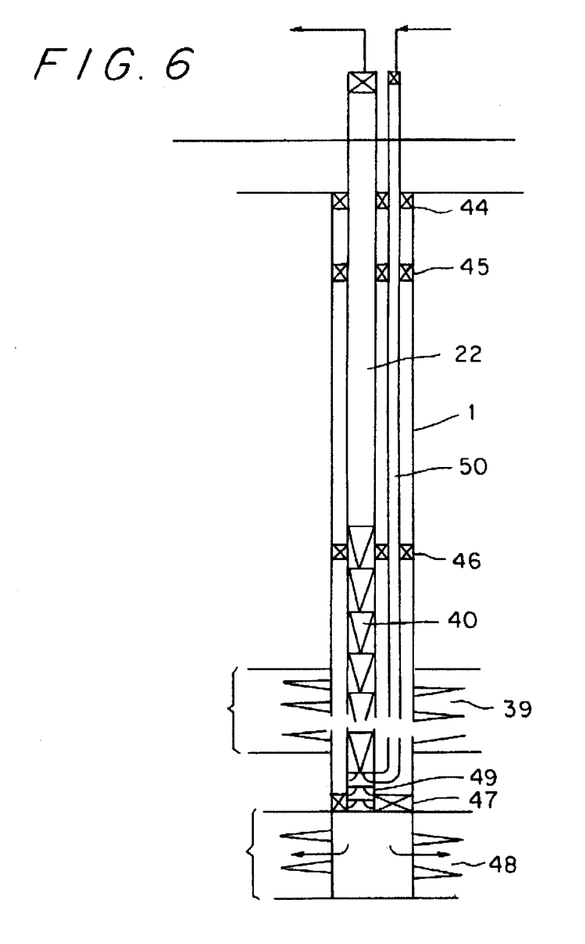
FIG. 6 shows a depth diagram for a well.

In FIG. 6 there is, purely schematically, shown an offshore well the casing of which is represented by 1 and the production pipe of which is represented by. Packers are represented by 44, 45 and 46 The cyclone apparatus according to the invention is represented by 40, as in FIG. 5, and the producing zone is also here represented by 39. Below the producing zone there is mounted a packer 47, which forms an upper limit for an injection zone 48.

In the apparatus 40 oil and water are separated. The oil ascends through the production pipe. Produced water is pressed down to the injection zone 48 by means of a multi-stage pump 49. The pump 49 is operated by means of electric power supplied from the surface or by hydraulic drive fluid, which, for example, may be produced water. The hydraulic drive fluid is supplied through the line 50 or by a cable corresponding to the line 50.

Figure 7:
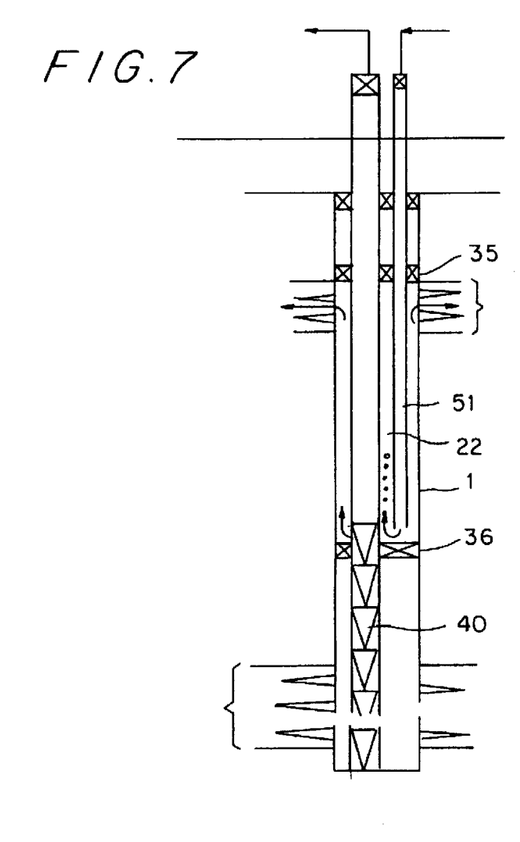
FIG. 7 shows a second depth diagram for a well.

The well arrangement shown in FIG. 7 corresponds in the main to FIG. 5A. The only difference is that extra lift is provided in the annulus 33 through the distribution valve (not shown here) by the introduction of $CO_2$ gas through a $CO_2$ line 51 or of hydrocarbon gas.

Figure 8:
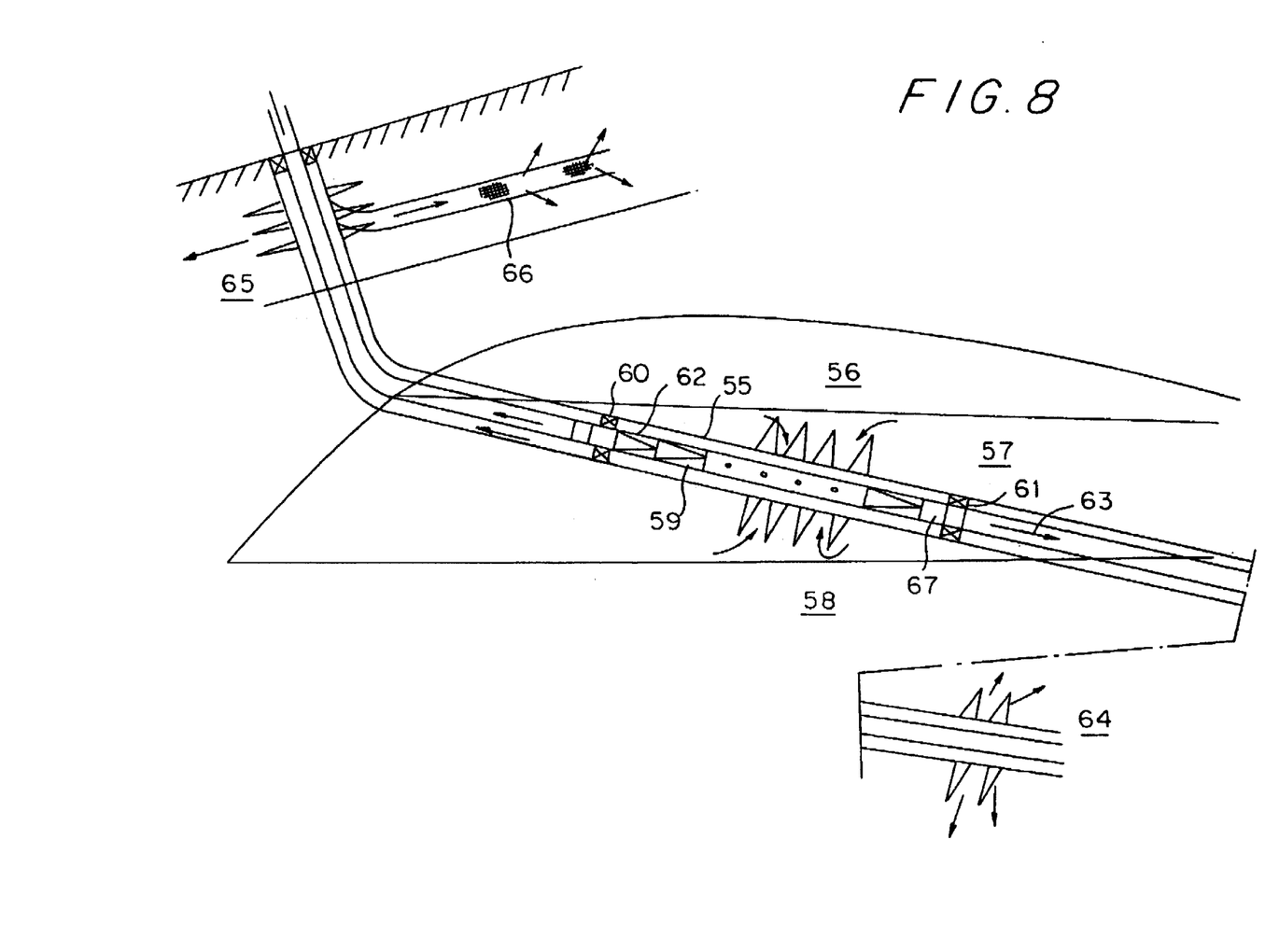
FIG. 8 shows a well system, purely schematic, in which the invention is utilized.

In the well system shown in FIG. 8, a well 55 has been drilled from the surface down through a hydrocarbon producing formation wherein there is, purely schematically, indicated a gas zone 56, an oil zone 57 and a water zone 58. In the well 55, an apparatus 59 according to the invention has been indicated. The oil producing zone 57 is, in the well, delimited by a packer 60 and another packer 61. Oil is passed up the production pipe 62. Produced water descends into the well, as indicated by 68, out into the water zone 58 by means of pump 67, and to the injection point 64, as shown.

Produced water may optionally/additionally be directed up through the annulus above the packer 60 and out into a waste zone 65, or out into a directionally drilled bore 66 and from there into the waste zone, as suggested by arrows.

If there is any danger of clogging the cyclones, these may be blown open by turning on the produced water instead of the oil flow, and rotating the direction of the flow in the system so that impurities are blown out.

It is also understood that the apparatus according to the invention may be used for carrying out logging/testing of quantity, pressure, temperature etc. in the well, since pressure, temperature, etc. may be measured in each flow from the connected cyclones by means of metering equipment built into the apparatus.

The spatial conditions in a well requires the use of narrow cyclones, having, for example, a diameter of 20–200 mm and one or several tangential inlets in a weakly concave rotation symmetrical cyclone body, wherein the inlet will give high rotational speed in the bottom reject of the cyclone, while achieving length and coalescing effect in the water core and maintaining the rotational speed with approximately constant peripheral speed (continuity). The cyclones may be cast/produced from a ceramic material having high wear resistance. Narrow cyclones such as these will operate at very high g forces (1000–2000).

What is claimed is:

1. An oil well system for separating oil from water in a production flow from a hydrocarbon reservoir at the lower end of a production pipe string; the system comprising:

a perforated casing; and a demountable separation module disposed within the casing, the separation module having a cylindrical housing and comprising;

threaded means for attaching the separation module to the production pipe string;

a separation module inlet opening in the cylindrical housing for admitting the production flow;

a cyclone separator disposed within the separation module and including a cyclone lateral tangential inlet terminating at the separation module inlet opening on an outer surface of the cylindrical housing, an oil outlet, and a water outlet;

a screening device disposed on the cylindrical housing to cover the separation module inlet opening, the screening device including apertures smaller than the cyclone inlet;

means for re-injecting water from the water outlet into the reservoir; and a water injection system for the reservoir, wherein the means for re-injecting water from the water outlet into the reservoir includes means for re-injecting water via deviated wells for geometric coverage as part of the water injection system;

wherein an annular space between the separation module and the perforated casing comprises means for distributing unseparated oil/water to the cyclone separator.

2. The system according to claim 1, wherein the cyclone inlet is coupled directly adjacent with the separation module inlet opening.

3. The system according to claim 1, wherein the means for re-injecting water from the water outlet into the reservoir includes a pump.

4. The system according to claim 1, wherein the means for re-injecting water includes downwardly-expressed water re-injection means.

5. The system according to claim 1, wherein the means for re-injecting water includes means for re-injecting at a higher elevation.

6. The system according to claim 1, wherein the threaded means includes standard threads.

7. The system according to claim 1, wherein the cyclone separator comprises a sub-module of the separation module.

8. The system according to claim 1, including plural cyclone separators.

9. The system according to claim 1, wherein the screening device and the separation module inlet opening are adjoining.

10. The system according to claim 1, wherein the separation module inlet opening is in the screening device.

11. A method for separating oil from water in a production flow from a hydrocarbon reservoir at the lower end of a production pipe string, comprising the steps of:

providing a perforated casing;

providing a demountable separation module having a cylindrical housing, disposed within the casing and including a separation module inlet opening;

attaching the separation module to the production pipe string;

disposing a cyclone separator within the separation module, the cyclone separator including a cyclone lateral tangential inlet terminating at the separation module inlet opening on an outer surface of the cylindrical housing, an oil outlet, a water outlet, and means for screening disposed between the separation module inlet opening and the perforated casing, the means for screening being disposed on the cylindrical housing to cover the separation module inlet opening and including apertures smaller than the cyclone inlet;

separating oil from water in the cyclone separator;

re-injecting water from the water outlet into the reservoir;

providing a water injection system for the reservoir, and wherein the step of re-injecting water from the water outlet into the reservoir includes re-injecting water via deviated wells for geometric coverage as part of the water injection system; and providing an annular space between the separation module and the perforated casing for distributing unseparated oil/water to the cyclone separator.

12. The method according to claim 11, including coupling the cyclone inlet directly to the separation module inlet opening.

13. The method according to claim 11, wherein the step of re-injecting water from the water outlet into the reservoir includes pumping.

14. The method according to claim 11, wherein the step of re-injecting water includes downwardly-expressing water.

15. The method according to claim 11, wherein the step of re-injecting water includes re-injecting at a higher elevation.

16. The method according to claim 11, wherein the step of attaching includes providing standard threads.

17. The method according to claim 11, wherein the cyclone separator comprises a sub-module of the separation module.

18. The method according to claim 11, including providing plural cyclone separators.

* * * * *